Figure 1:
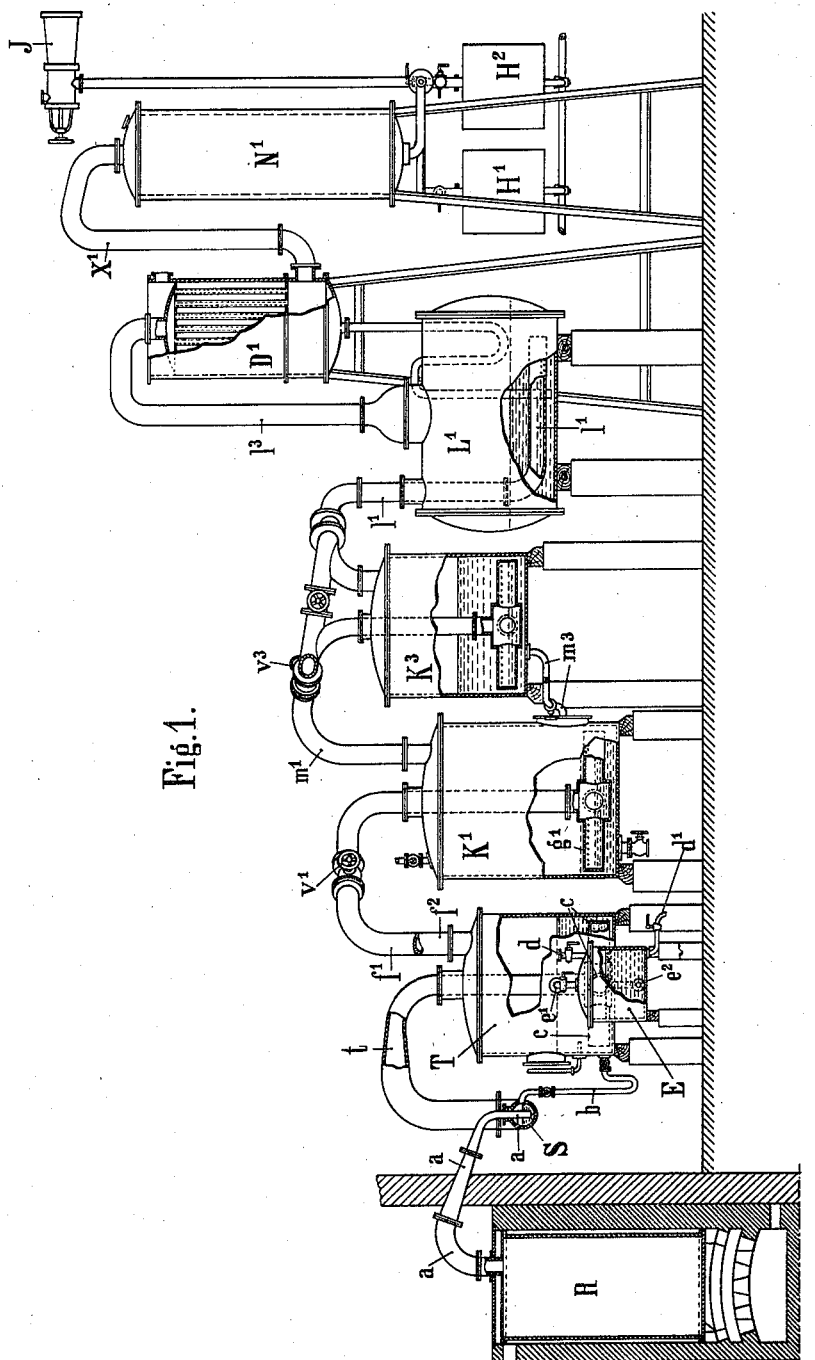

R. STROBACH.
PROCESS OF DISTILLING WOOD.
APPLICATION FILED MAY 16, 1908.

1,015,519.

Patented Jan. 23, 1912.

2 SHEETS—SHEET 2.

UNITED STATES PATENT OFFICE.

RUDOLF STROBACH, OF PRAGUE-ZIZKOW, AUSTRIA-HUNGARY.

PROCESS OF DISTILLING WOOD.

1,015,519. Specification of Letters Patent. Patented Jan. 23, 1912.

Application filed May 13, 1908. Serial No. 433,259.

*To all whom it may concern:*

Be it known that I, RUDOLF STROBACH, residing at Konigliche Weinberge, am Riegerpark 1472, Prague-Zizkow, Austria-Hungary, subject of the Emperor of Germany, have invented certain new and useful Improvements in and Relating to Processes for Distilling Wood, of which the following is a specification.

The invention relates to a process for extracting from the gases and vapors produced in the destructive distillation of wood and like organic materials, impurities and by-products, such as tar, acetates, wood alcohol, etc. In such extraction and purification much difficulty has heretofore been experienced in removing and collecting the tar efficiently, conveniently and economically. In the most customary method of extracting by-products, the tar and other condensable constituents of the gas or vapor are condensed in one operation, so producing a mixture of tar and a complex liquid termed pyroligneous acid; the bulk of the tar is then permitted to settle out, the pyroligneous acid (still containing some tar) is evaporated to free it from the remaining tar, and the vapors are treated in suitable apparatus to separate the acetic acid and wood-alcohol contained in it. The tar so obtained still contains some pyroligneous acid, and must be purified. As an alternative to this process it has been proposed to accomplish the separation of the tar by passing the gases or vapors produced by destructive distillation, through a series of successive baths comprising in the series mixtures in varying proportions of tar and acetic acid, and in so doing progressively reducing the temperature of the gases and vapors; these baths, however, being at so low temperatures as to cause the acetic acid to be condensed and held back. Such method has numerous important disadvantages, among which are that the acetic acid must subsequently be separated from the tar by evaporation and distillation as a separate operation and in special apparatus involving the application of further heat.

According to the present process the gases and vapors resulting from the destructive distillation are passed through a single bath only of tar, and this tar bath is initially free from acid, and is maintained, initially and thereafter, at such a temperature that the acid in the gases and vapors is not retained by the tar, but passes on to be separated thereafter; while the tar in such gases and vapors is retained, in an acid-freed condition, in the tar bath, and may be drawn off from time to time.

My invention further comprises passing the gases or vapors resulting from destructive distillation, through a heated acid-freed tar bath of regulated depth such that a single passage of the gases and vapors through such bath results in the practically complete extraction of the tar carried by such gases and vapors, without the holding back of acetic acid and the like. This improved method has the important advantages that not only is the tar so obtained substantially free from acid and therefore in condition for immediate sale, but the other condensable by-products contained in the gases and vapors are not cooled to such a point as to preclude their separation, one after the other, in a single continuous operation and without the addition of further heat either to the gases or vapors or to condensates therefrom.

The object of the invention is to extract by-products from the gases and vapors produced by the destructive distillation of wood and like organic substances, in a more efficient and economical manner and by a continuous process and to separate them, one from another, during the extraction and without the addition of further heat to the gases or vapors or to the condensates obtained therefrom, and to obtain directly tar substantially free from acid, wood alcohol, etc., and conversely, to obtain acetic acid or its acetate, wood alcohol, etc., substantially free from tar.

In the accompanying drawings I illustrate an apparatus adapted for carrying out the process as above described, and I will herein describe the process as carried out in the apparatus.

Figure 2:
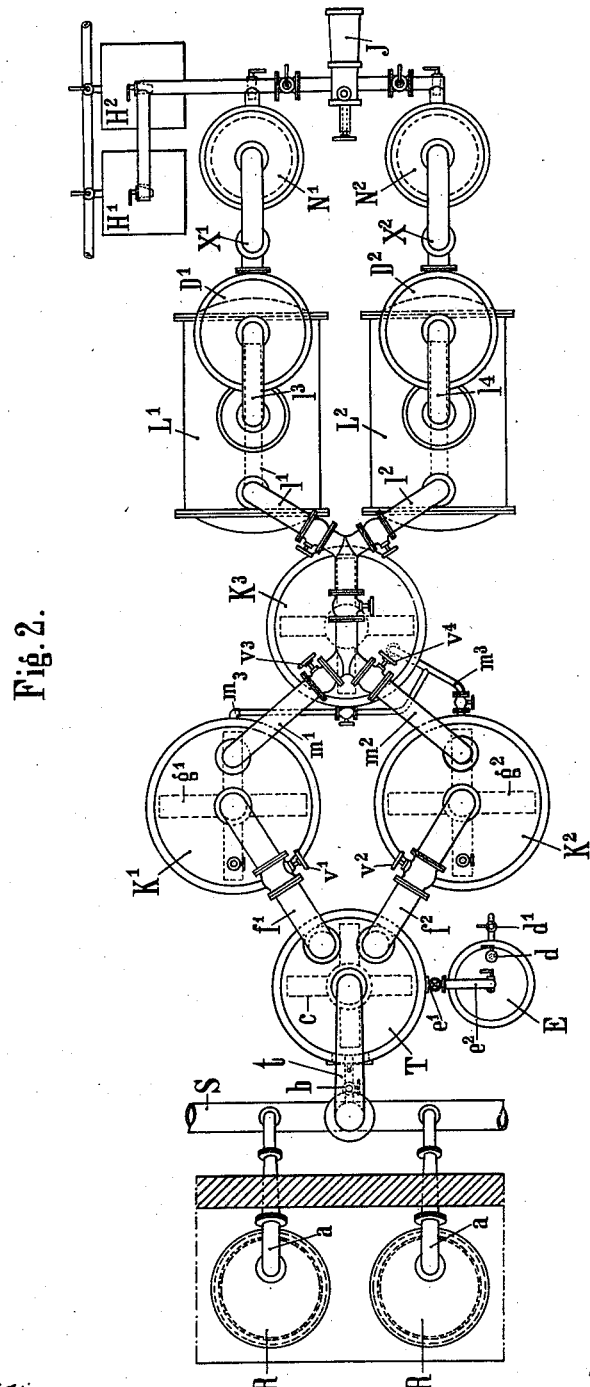

In said drawings: Figure 1 shows more or less diagrammatically a side elevation and partial section of the apparatus, and Fig. 2 shows a top view of the apparatus.

In said drawings, R designates a plurality of vertical retorts adapted for the destructive distillation of wood and like materials. There may be as many of these retorts as desired; and there should be at least two such retorts, since according to my process, I operate a plurality of retorts simultaneously and charge them in alternation or rotation, mingling together the gases or vapors evolved from the different retorts, and conducting the charging in such manner that the mingled gases and vapors from the several retorts have a practically uniform composition. It will be understood that in the gases and vapors first given off from a freshly charged retort, there is very little tar, and that the proportion of the tar in the gases and vapors evolved from the retort increases as the distillation goes on. By charging the retorts in alternation or succession at proper intervals, and mingling the gases and vapors from the several retorts before passing them to the purifying apparatus, it is possible to maintain a practically uniform composition of these gases and vapors; and this is very important for the successful carrying out of the present process.

The gases and vapors resulting from the destructive distillation are conducted from the several retorts R through pipes $a$ into a collecting tank or header S common to the series of retorts and are thence conveyed through a pipe $t$ into a tar separator T, the said pipe $t$ extending to near the bottom of the tar separator and there terminating in a cross-shaped distributer $c$ the arms of which are provided with a plurality of small perforations for the escape of the gases and vapors into the main portion of this separator. The tar separator T is charged with tar before the operation begins. This tar is of sufficient depth or thickness above said distributer to extract practically the whole quantity of tar contained in the smoke during the passage thereof therethrough. A valved by-pass pipe $b$ is provided, connecting the header S with the main portion of the tar separator T, whereby tar which collects in this header may be drawn off from time to time into the tar separator. In practice the tar is not permitted to collect in this header S to such extent that any material separation of tar from acetic acid and other by-products can take place in the header.

The gases and vapors from the retorts reach the tar separator at a temperature of from 300° to 350° F., and, being distributed through the bath of tar by means of the distributer $c$, pass up through this bath of tar and, owing to the relatively great depth of this bath, practically all of the tar in such gases or vapors is held back, the remaining gases and vapors passing from the tar separator through the pipe $f^1$ or $f^2$; and by reason of the relatively high temperature at which this tar bath is maintained, both initially and thereafter, the acetic acid, wood alcohol, and other condensable substances in the gases and vapors from the retorts are not held back or retained by the tar bath, but pass onward through the pipe $f^1$ or $f^2$.

These gases and vapors leave the tar separator at a temperature of about 240° to 250° F.

In the tar separator as well as in the remainder of the apparatus, a partial vacuum is maintained by means of an injector J at the end of the apparatus, whereby a positive flow through the apparatus is maintained. Owing to the depth of the tar bath in the tar separator T, the retorts R are operated under a pressure of usually from three to five cm. of water.

From time to time, excess of tar in the separator T is drawn off by means of valved pipes $e^1$, $e^2$, to a collecting tank E provided with an air valve $d$ and draw off cock $d'$; tar being drawn off from time to time in this manner to maintain a nearly uniform depth of tar in the separator T.

The tar-freed gases escaping through the pipe F pass through one or another of two receivers, $K^1$ and $K^2$, provided each with a cross-shaped distributer $g^1$ or $g^2$. In these receivers milk of lime solution is contained. The receivers are operated in alternation, for which reason valves $v^1$ and $v^2$ are provided in the pipes, $f^1$ and $f^2$, leading from the tar separator to these receivers, and corresponding valves $v^3$ and $v^4$ are provided in the pipes $m^1$ and $m^2$, leading from the receivers. The gases and vapors, in passing through the milk of lime solution in one or the other of these receivers, part with their acetic acid, which later combines with the lime as acetate of lime. The receivers are operated in alternation, one being emptied and recharged while the other is receiving the gas. As soon as the contents of one receiver are found to be neutralized by the acetic acid, absorbed therein, this receiver is put out of service and the gases are passed through the other receiver.

The gases leaving the receiver $K^1$ or $K^2$ pass into a further receiver $K^3$ of similar construction and also containing milk of lime solution, in order that any remaining acetic acid in the gas may be removed. This third receiver $K^3$ is connected with receiver $K^1$ and $K^2$ by valved pipes $m^3$, whereby the milk of lime in receiver $K^3$ may be drawn off from time to time into one of the other receivers and replaced by fresh milk of lime.

The acid-freed gases from receiver $K^3$ pass off through valved pipes $l^1$ and $l^2$ into one or another of two tanks $L^1$ and $L^2$, containing water and in which a portion of the water contained in the gases and vapors is condensed, and then the gases pass through pipe $l^3$ or $l^4$, into one or another of two dephlegmators $D^1$ and $D^2$ in which water still contained in the gases is extracted therefrom to such extent that the wood alcohol to be subsequently condensed from these gases will have a suitable degree of concentration. From these dephlegmators pipes X¹ and X² lead to coolers or condensers N¹ and N², wherein the wood alcohol contained in the gases is condensed and drawn off into tanks H¹ and H²; the gases remaining which are in the main fixed gases, being drawn off by means of the injector J.

It will be observed that by the treatment described, and in the apparatus illustrated and described, the several valuable by-products contained in the initially evolved gases and vapors, are each separated substantially without admixture with another; that no heat is required to be added to any one of the several condensates in order to extract therefrom a substance which should not have been absorbed therein but should have passed on into one of the later vessels of the apparatus to be there extracted; and that the operation is a continuous one.

What I claim is:—

1. The herein described process of obtaining acid-free tar and tar-free pyroligneous acid vapors from the gases and vapors evolved during the destructive distillation of wood and like organic substances, which comprises passing said hot gases and vapors while at a suitable and substantially uniform temperature through a suitable bath of hot tar; and maintaining such a quantity of tar in said bath as will cause the condensation and extraction of substantially all of the tar from said hot gases and vapors, but which quantity of tar will be heated to and maintained, solely by the heat of said gases and vapors, at a temperature which precludes the existence of condensed pyroligneous acid in said tar-bath.

2. The herein described process of obtaining acid-free tar and tar-free pyroligneous acid vapors from the gases and vapors evolved during the destructive distillation of wood and like organic substances, which comprises mingling the hot gases and vapors from a plurality of retorts at different stages of distillation; passing said hot mingled gases and vapors through a suitable bath of hot tar; and maintaining such a quantity of tar in said bath as will cause the condensation and extraction of substantially all the tar from said hot gases and vapors, but which quantity of tar will be heated to and maintained, solely by the heat of said gases and vapors, at a temperature which precludes the existence of condensed pyroligneous acid in said tar-bath.

3. The herein described process of separating constituents from the gases and vapors evolved during the destructive distillation of wood and like organic substances, which comprises passing said hot gases and vapors through a suitable hot tar-bath; maintaining such a quantity of tar in said bath as will cause the condensation and extraction of substantially all of the tar from said hot gases and vapors, but which quantity of tar will be maintained by the heat of said gases and vapors at a temperature which precludes the existence of condensed pyroligneous acid in said tar-bath; and then separately condensing and extracting the remaining condensable constituents.

4. In the distillation of wood and like organic substances, a method of separating various constituents from the hot distillation gases and vapors, which comprises passing the same through a suitable bath maintained by said hot gases and vapors at a sufficient temperature to cause the extraction of substantially all of the tar therefrom, then passing the remaining gases and vapors through a bath maintained thereby at a temperature sufficient to cause the extraction of substantially all of the acid vapors and then condensing the water and the alcoholic vapors.

In witness whereof I have hereunto set my hand in presence of two witnesses.

RUDOLF STROBACH.

Witnesses:
JOHANNA GRUNOW,
HARRY GUTH.